United States Patent [19]

Ito et al.

[11] Patent Number: 4,779,905

[45] Date of Patent: Oct. 25, 1988

[54] FORCEDLY AIR-COOLED ENGINE GENERATOR OF VERTICAL SHAFT TYPE

[75] Inventors: Ryoichi Ito; Kenji Ueno; Tutomu Wada; Osamu Murakami; Shigeru Kawabata; Kazuo Higo; Akiyoshi Morikawa, all of Osaka, Japan

[73] Assignee: Kubato Ltd., Osaka, Japan

[21] Appl. No.: 89,335

[22] Filed: Aug. 25, 1987

[30] Foreign Application Priority Data

Aug. 25, 1986 [JP] Japan ............................... 61-198513
Aug. 25, 1986 [JP] Japan ............................ 61-12905[U]

[51] Int. Cl.[4] ...................... B60R 18/00; F02B 63/04

[52] U.S. Cl. .................................. 290/1 B; 290/1 A; 290/1 R; 310/58; 310/59; 310/60 R; 123/2

[58] Field of Search ................. 290/1 R, 1 A, 1 B, 2, 290/4 R, 4 B, 1 C; 310/52, 57, 58, 59, 60 R, 61, 50; 322/1, 10, 48; 123/2, 41.65, 198 E, 179 D, 179 CC, 179 R, 179 SE, 149 R, 149 C, 149 D, 185 A, 185 BA, 185 B; 60/721

[56] References Cited

U.S. PATENT DOCUMENTS 1,892,997 1/1933 Oldenburg ....................... 310/60 R
2,469,820 5/1949 Fuge ..................................... 310/58
2,543,541 2/1951 Angle ................................. 290/1 B
3,064,152 11/1962 Paul et al. ................... 310/60 R X
3,643,119 2/1972 Lukens ................................ 310/60
4,173,951 11/1979 Ishihara ................................. 123/2
4,540,888 9/1985 Drewry et al. ..................... 290/1 R
4,553,055 11/1985 Auernhammer ................. 310/59 X
4,622,923 11/1986 Nishimura et al. ..................... 123/2
4,647,835 3/1987 Fujikawa et al. .............. 290/1 B X
4,677,940 7/1987 Bracht et al. ................. 290/1 A X

FOREIGN PATENT DOCUMENTS 59-39933 3/1984 Japan .
77727 5/1985 Japan .

*Primary Examiner*—William M. Shoop, Jr.
*Assistant Examiner*—Paul Ip
*Attorney, Agent, or Firm*—Lowe, Price, LeBlanc, Becker & Shur

[57] ABSTRACT

In an engine generator having a work generator arranged at the upper side of an engine of a vertical crank shaft type, the output shaft of the engine projects upwards from the engine crank case so as to be connected to the rotor of the work generator. And the stator is arranged so as to encircle the rotor and to be encircled by an air induction casing. A cooling fan of a centrifugal blower type is located at the upper end of the rotor shaft with the blades thereof directed to the side of the generator so as to supply a cooling air flowing upwards to both the interior and the exterior of the stator during operation.

3 Claims, 2 Drawing Sheets

FORCEDLY AIR-COOLED ENGINE GENERATOR OF VERTICAL SHAFT TYPE

BACKGROUND OF THE INVENTION

1. Field of the Invention

The present invention relates to an engine generator adapted to be used as an electric power source for outdoor works and lighting, and particularly to an engine generator of a vertical shaft type having a work generator arranged at the upper side of an engine with a vertical crank shaft.

2. Prior Art

It is known in the art that an engine generator which uses an engine of a vertical crank shaft type has so far been disclosed, for example in Japanese Provisional Patent Publication No. 39933 of 1984, wherein a work generator is arranged at the underside of the engine. In this case, following problems are encountered with said such engine generator. That is, if engine oil leaks, the leaked oil is apt to flow into the interior of the generator to cause an insulation deterioration. And also the vibration of the engine generator is apt to be enlarged because the vibromotive position by the engine becomes higher than the gravity center of the whole engine generator, namely gets far from the support foot thereof on earth.

Therefore, the applicant (the assignee) of the present invention has disclosed in Japanese Utility Model Publication No. 77727 of 1985 an improved engine generator which has a generator arranged at the upper side of a forcedly air-cooled engine of a vertical crank shaft type.

In the engine generator disclosed in said publication and shown in FIG. 4, the generator 52 of an interiorly ventilated type is arranged at the upper side of the forcedly air cooled engine 50 of a vertical crank shaft type having a chamber 51 for a cooling fan provided at the upper portion thereof with the generator 52 aligned coaxially to the output shaft 53 of the engine 50, and there are provided with an air suction opening 55 at the upper portion of the generator casing 54 as well as an air exhaust opening 56 at the lower surface thereof 54 so that a cooling air sucked through the air suction opening 55 may be supplied downwards to the engine side by way of the interior of the generator.

In such conditions, since the virbomotive position becomes lower than the gravity center of the whole engine generator, the engine generator gets more stable sufficient to make the vibration thereof less.

However, in this prior case, since the cooling for the engine generator is carried out so as to cool the interior of the generator and the circumference of the engine by the downward flow of the cooling air supplied from the upper side thereof, the air discharged from the engine portion goes up along the engine generator due to its elevated temperature and is sucked again from the air suction opening provided at the upper portion of the generator. Hence, the cooling efficiency for the engine generator gets worse. Further, since the air suction opening is provided at the upper portion of the generator, dust and drops of water such as rain are apt to enter into the generator through the opening.

SUMMARY OF THE INVENTION

The present invention is directed to solving the problems noted above, and has for its object to provide a forcedly air-cooled engine generator of a vertical shaft type, wherein the cooling for the engine generator is carried out more effectively as well as dust and drops of water are prevented from entering into the generator in addition to such prior advantages as the oil leaked from the engine is prevented from causing the insulation deterioration in the interior of the generator and the vibration of the engine generator gets less.

The means of the present invention for accomplishing the above purpose is a forcedly aircooled engine generator of a vertical shaft type, characterized in that; the output shaft of the engine projecting upwards through the upper wall of the engine crank case and being connected coaxially to the rotor of the work generator, the stator being arranged so as to encircle said rotor and to be encircled by an air induction casing at the outside of said stator, a cooling fan of a centrifugal blower type being located at the upper end of the rotor shaft with the blades thereof positioned at the lower side thereof, and both the interior and the exterior of the stator being adapted to be cooled by a cooling air flowing upwards therethrough.

And, since the cooling air exhausted from the engine generator is prevented from being sucked again into the cooling line thereof, the cooling efficiency is enhanced. And also since the cooling air is discharged from the air ventilation opening provided at the upper portion of the engine generator, dust and drops of water are prevented from entering into the generator.

DESCRIPTION OF THE PREFERRED EMBODIMENT

Figure 1:
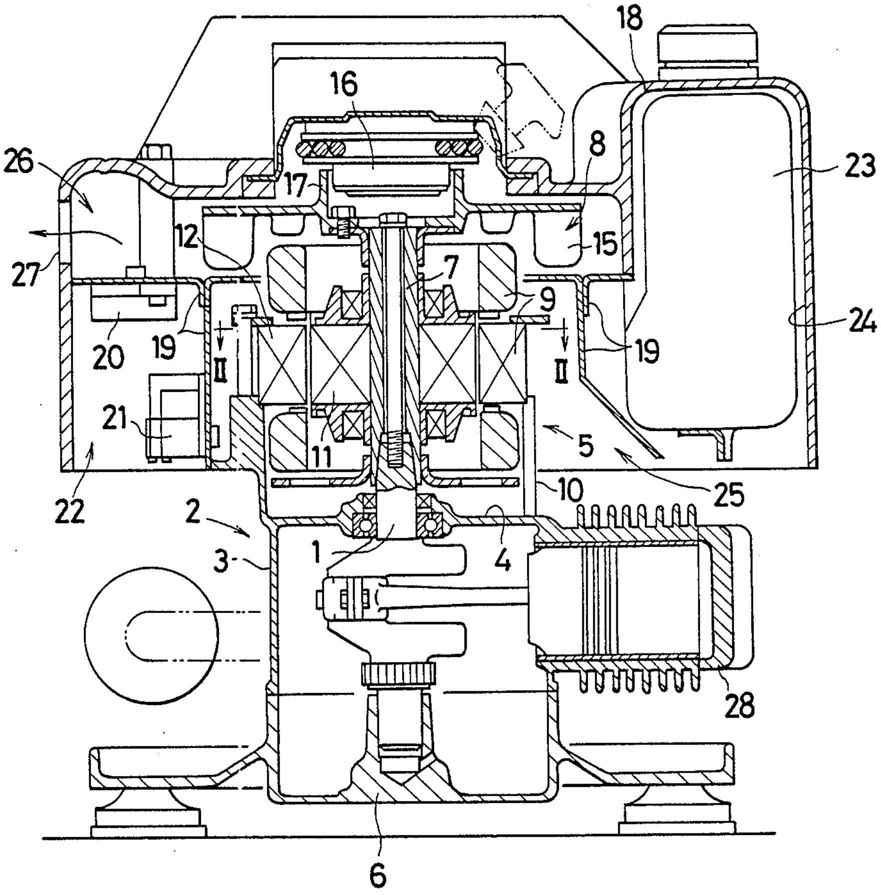
FIG. 1 is a vertical sectional view of a preferred embodiment of the present invention.

An engine generator comprises an engine 2 of a vertical crank shaft type having a crank shaft 1 disposed vertically, and an a.c. generator 5 of an interiorly ventilated type arranged onto the upper wall 4 of the crank case 3 of said engine 2.

The vertical crank shaft 1 of the engine 2 is supported rotatably at the lower end thereof by an oil pan member 6 and extends through the upper wall 4 of the crank case 3 at the upper end thereof towards the outside of the crank case 3, which projected upper end makes the output shaft thereof.

To the projected upper end of the crank shaft 1 is directly connected the rotor shaft 7 of the generator 5. And to the upper end of the rotor shaft 7 is fixedly secured a centrifugal fan 8 of a blower type.

On the other hand, the stator 9 of the generator 5 is fixedly positioned onto a stator support frame 10 which is formed integratedly and projectingly from the upper wall 4 of the crank case.

Accordingly, since the stator 9 is supported by said stator support frame 10, it is possible to minimize a center gap between the core of the rotor 11 and that 12 of the stator 9 and also to minimize and equalize the clearance between said both cores to enhance its generating efficiency.

Figure 2:
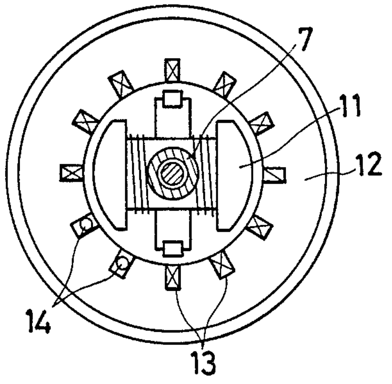
FIG. 2 is a sectional view on line II—II in FIG. 1.

As shown in FIG. 2, a coil 13 for taking out working power and a coil 14 for taking out engine ignition controlling power are set up in the core 12 of the stator 9 so that electric current is generated in the both coils 13, 14 by the rotation of the rotor 11 fitted onto the rotor shaft 7.

The cooling fan 8 is fixed to the upper end of the rotor shaft 7 and provided with the blades 15 directed downwards to the stator disposed at the lower side thereof. The blades 15 have the inner diameter defined larger than the outer diameter of the stator 9 so that the generator 5 can be cooled effectively by means of cooling air flows produced by the rotation of the cooling fan 8 so as to pass upwards through both the interior and the exterior of the stator 9. And on the upper surface of the cooling fan 8 there is integratedly provided a stator pulley 17 which can be detachably engaged with an engaging hook of a recoil starter 16.

The outside of the generator 5 is covered with an ornamental cover 18 which is also used as an air induction casing. The inside of the ornamental cover 18 is partitioned off by partition plates 19 to a chamber 22 for accommodating electric parts such as an ignition unit 20 and a capacitor 21 for power generation, a fuel tank accommodating chamber 24, a stator accommodating chamber 25 and a spiral chamber 26 for encircling the cooling fan 8. In the circumferential wall of the spiral chamber 26 there is provided with an air exhaust opening 27, through which an exhaust cooling air is adapted to be discharged tangentially.

The sprial chamber 26 is in communication with the stator accommodating chamber 25 at the central portion thereof and also in communication with the outside of the cover 18 through the air exhaust opening 27 provided in the circumferential wall of the cover 18. And the engine cylinder 28 located at the lower portion of the stator accommodating chamber 25 is covered from thereabove by the ornamental cover 18 which also serves as an air induction casing which encircles the stator so that the cylider 28 may be cooled by the cooling air supplied into the stator accommodating chamber 25.

In the fuel tank accommodating chamber 24, there is provided with a fuel tank 23 comprising an elongated vertical container. Accordingly, since the area of the fuel level in the tank 23 becomes narrower, the vertical variation of the fuel level can be lessened at the time of tilting or swaying thereof and consequently fuel leakage from the airvent pipe for the fuel tank 23 can be diminished effectively.

Figure 3:
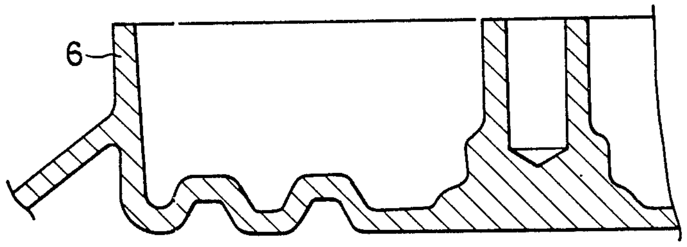
FIG. 3 is a sectional view showing the principal part of a variant embodiment of the oil pan.
Figure 4:
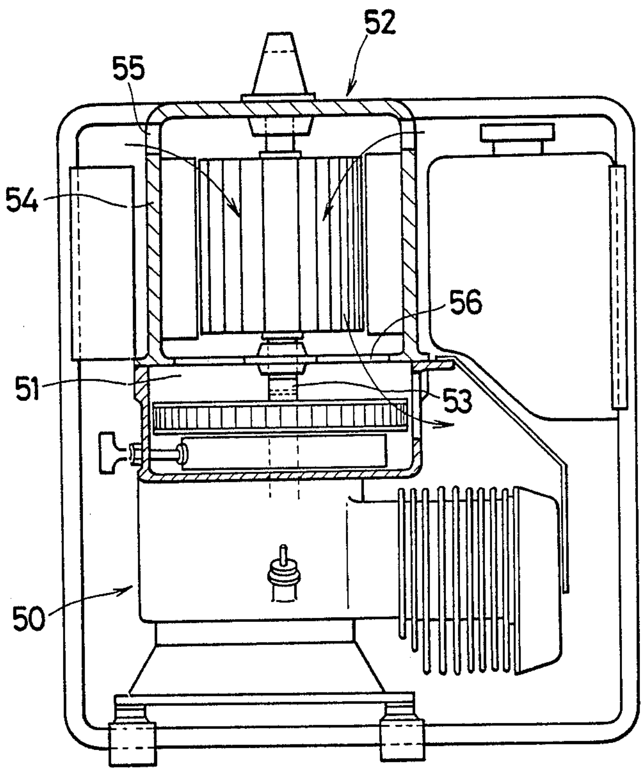
FIG 4 PRIOR ART
FIG. 4 is a fragmental vertical sectional view showing an engine generator in the prior art.

In the variant embodiment of the present invention shown in FIG. 3, the bottom wall of the oil pan member 6 is formed wavy so as to extend the radiation area thereof for enhancing the heat radiation effect as well as to strengthen the oil pan itself for preventing any damages.

We claim:

1. A forced air-cooled engine generator comprising:

a vertical shaft type generator having a central rotor and a stator surrounding the rotor, an air-cooled engine having an output shaft disposed below said generator having a vertical crank shaft coupled to the output shaft and a crankcase, the crank shaft extending upwardly through the crankcase coaxially with said rotor and coupled thereto in driving engagement, a centrifugal-type cooling fan disposed above the generator rotor, coaxially and coupled in driving engagement with the crank shaft and extending outwardly over the generator stator; and an air induction casing surrounding said generator and at least the portion of said engine, said casing defining an air inlet surrounding said engine and an outlet adjacent said fan whereby said fan will draw cooling air into said casing, around said engine, upwardly through and around the stator and will expel said heated cooling air through the outlet without permitting the same to recirculate within said casing.

2. The forced air-cooled engine generator of in claim 1 wherein the stator include a working power generating coil and an ignition controlling power generating coil for the engine.

3. the forced air-cooled engine generator of claim 1, wherein said casing includes a support frame for the stator of the generator formed integrally with and disposed projecting from the upper surface of the crank case.

* * * * *